(12) United States Patent  
Stute

(10) Patent No.: US 9,256,735 B2  
(45) Date of Patent: Feb. 9, 2016

(54) DETECTING EMERGENT BEHAVIOR IN COMMUNICATIONS NETWORKS

(71) Applicant: Masergy Communications, Inc., Plano, TX (US)

(72) Inventor: Michael Roy Stute, Plano, TX (US)

(73) Assignee: Masergy Communications, Inc., Plano, TX (US)

( * ) Notice: Subject to any disclaimer, the term of this patent is extended or adjusted under 35 U.S.C. 154(b) by 100 days.

(21) Appl. No.: 13/648,895

(22) Filed: Oct. 10, 2012

(65) Prior Publication Data

US 2013/0117852 A1 May 9, 2013

Related U.S. Application Data

(60) Provisional application No. 61/545,483, filed on Oct. 10, 2011.

(51) Int. Cl.
   *G06F 21/55* (2013.01)
   *H04L 29/06* (2006.01)

(52) U.S. Cl.
   CPC ............ *G06F 21/55* (2013.01); *H04L 63/1425* (2013.01)

(58) Field of Classification Search
   CPC ....................................................... G06F 21/55
   See application file for complete search history.

(56) References Cited

U.S. PATENT DOCUMENTS

| 7,594,270 | B2 | 9/2009 | Church et al. |
| 8,160,847 | B2 | 4/2012 | Solomon |
| 2004/0049693 | A1 | 3/2004 | Douglas |
| 2005/0111367 | A1 | 5/2005 | Chao et al. |
| 2007/0169194 | A1 | 7/2007 | Church et al. |
| 2009/0089035 | A1 | 4/2009 | Solomon |
| 2010/0050262 | A1 | 2/2010 | Knapp et al. |

FOREIGN PATENT DOCUMENTS

| WO | WO 2003/083660 A1 | 10/2003 |
| WO | WO 2010/011180 A1 | 1/2010 |

OTHER PUBLICATIONS

PCT International Search Report and Written Opinion dated Dec. 11, 2012 for corresponding PCT Application No. PCT/US12/59578 (9 pgs.).
European Search Report date mailed Jul. 1, 2015; European Application No. 12840326.8.

*Primary Examiner* — Samson Lemma
*Assistant Examiner* — Simon Kanaan
(74) *Attorney, Agent, or Firm* — McGuireWoods, LLP

(57) ABSTRACT

Systems and methods of detecting emergent behaviors in communications networks are disclosed. In some embodiments, a method may include decomposing a plurality of data packets into a plurality of component data types associated with a candidate alert representing a potential security threat in a network. The method may also include retrieving, from a database, a count for each of a plurality of historical data types matching at least a subset of the component data types, each of the counts quantifying an amount of data of a corresponding historical data type previously detected in the network in a given time period. The method may further include calculating a score that indicates a discrepancy between an amount of data in each of the subset of the component data types and the counts for each corresponding historical data type in the same time period, and handling the candidate alert based upon the score.

18 Claims, 9 Drawing Sheets

DETECTING EMERGENT BEHAVIOR IN COMMUNICATIONS NETWORKS

CROSS-REFERENCE TO RELATED APPLICATIONS

This application claims the benefit of the filing date of U.S. Provisional Patent Application No. 61/545,483 titled "Methods of Detecting Emergent Behavior in Communications Networks" and filed on Oct. 10, 2011, the disclosure of which is hereby incorporated by reference herein in its entirety.

TECHNICAL FIELD

This disclosure relates generally to network security, and more particularly, to systems and methods of detecting emergent behaviors in communications networks.

BACKGROUND

An advanced persistent threat (APT) attack represents one type of cyber security attack that is difficult to detect using traditional intrusion detection techniques. An APT attack is a network attack in which an unauthorized person gains access to a network and stays there undetected for a long period of time. The goal of an APT attack is to steal data rather than to cause damage to the network. Therefore, APT attacks generally target organizations in sectors with high-value information, such as national defense, manufacturing and the financial industry.

In a simple non-APT attack, the intruder tries to get in and out as quickly as possible in order to avoid detection by the network's intrusion detection system. In an APT attack, however, the intruder's goal is not to get in and out, but rather to achieve ongoing access. To maintain access without discovery, the intruder may continuously rewrite code and employ sophisticated evasion techniques. Some APT attacks can be so complex that they require a full-time administrator.

An APT attacker often uses "spear fishing," a type of social engineering access to the network through legitimate means. Once access has been achieved, the attacker establishes a backdoor, gathers valid user credentials (especially administrative ones), and moves laterally across the network installing more backdoors. These backdoors then allow the attacker to install bogus utilities and create a "ghost infrastructure" for distributing malware that may remain hidden in plain sight.

SUMMARY

Embodiments disclosed herein are directed to systems and methods of detecting emergent behaviors in communications networks. For example, these embodiments may generally provide methods for detecting emerging behaviors associated with cyber security attacks, such as advanced persistent threat (APT) attacks, on communications networks. Other embodiments of the present disclosure also generally provide methods of analyzing data that reduce common occurrences of little value and identify those events that accurately indicate a security breach has occurred or will occur. For instance, in an embodiment, the methods of analyzing data comprise methods of analyzing metadata (data about data) such that it may produce more actionable alerts with fewer false positives and fewer false negatives. These methods of analyzing metadata may also reduce the number of total alerts while increasing the relevance of the alerts that are actually released to a security analyst's console.

In an illustrative, non-limiting embodiment, a method may include decomposing a plurality of data packets into a plurality of component data types, the plurality of data packets associated with a candidate alert representing a potential security threat in a communications network. The method may also include retrieving, from a database, a count for each of a plurality of historical data types, the plurality of historical data types matching at least a subset of the component data types, each of the counts quantifying an amount of data of a corresponding historical data type previously detected in the communications network in a given time period. The method may further include calculating a score that indicates an aggregate discrepancy between an amount of data in each of the subset of the component data types and the counts for each corresponding one of the historical data types in the given time period, and handling the candidate alert based, at least in part, upon the score.

In some implementations, at least one of the plurality of data types may include a combination of at least two elements selected from the group consisting of: a protocol, a source address, a destination address, a source port, a destination port, an alert type, and a service type. Accordingly, calculating the score may include applying a weight to a discrepancy involving a data type having a combination of fewer of the elements that is less than another weight applied to another discrepancy involving another data type having another combination of more of the elements, and calculating a weighted average of each discrepancy and corresponding weight.

Additionally or alternatively, the given time period may include a combination of two or more of: a time interval, a day of the week, a day of the month, a week of the month, a day of the year, or a month of the year. In that case, calculating the score may further involve applying a weight to a discrepancy involving a time period equal to a day of the week that is less than another weight applied to another discrepancy involving another time period equal to a time interval, applying a weight to a discrepancy involving a time period equal to a day of the month that is less than another weight applied to another discrepancy involving another time period equal to day of the week, or applying a weight to a discrepancy involving a time period equal to a day of the year that is less than another weight applied to another discrepancy involving another time period equal to a day of the month; and then calculating a weighted average of each discrepancy and corresponding weight.

In some embodiments, counts may include at least one of: a number of packets entering the communications network, a number of packets leaving the communications network, an amount of data entering the communications network, or an amount of data leaving the communications network. Moreover, handling the candidate alert may comprise, in response to the score meeting a threshold value, issuing the candidate alert, or in response to the score not meeting the threshold value, suppressing the candidate alert.

In some cases, prior to handling the candidate alert, the method may include calculating a complexity of one or more of the plurality of data packets and modifying the score based, at least in part, upon the complexity. For example, calculating the complexity further comprises executing a Particle Swarm Optimization (PSO) technique. Additionally or alternatively, calculating the complexity further comprises executing a Force Vector Surface Optimization (FVSO) technique.

The method may also include updating, in the database, one or more of the counts for each of a plurality of historical data types in the given time period based, at least in part, upon the amounts of data in each of the subset of the component data types. The method may also include updating, in the database, a prediction accuracy of one or more of the counts for one or more historical data types corresponding to the subset of the components data types in the given time period. The method may further include selecting the subset of the component data types among the plurality of data types, at least in part, by determining which of the corresponding historical data types has a prediction accuracy above a threshold value.

In another illustrative, non-limiting embodiment, a method may include decomposing a plurality of data packets into a plurality of component data types, the plurality of data packets associated with a candidate alert representing a potential security threat in a network, at least one of the plurality of data types including a combination of two or more of: a protocol, a source address, a destination address, a source port, or a destination port. The method may also include, for each of the plurality of data types, determining one or more counts selected from the group consisting of: a number of packets entering the network, a number of packets leaving the network, an amount of data entering the network, or an amount of data leaving the network. The method may further include updating, in a database, one or more historical counts for each of a plurality of historical data types corresponding to the plurality of data types in a given time period based upon the one or more counts.

The method may also include updating, in the database, a prediction accuracy of the one or more historical count for each of the plurality of historical data types corresponding to the plurality of data types in the given time period. In some cases, the method may include determine that an expected event has not taken place in the network based, at least in part, upon an analysis of the one or more historical counts in the given time period, and issuing a missing event alert.

In various embodiments, one or more of the techniques described herein may be performed by one or more computer systems. In other various embodiments, a tangible or non-transitory computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Figure 1:
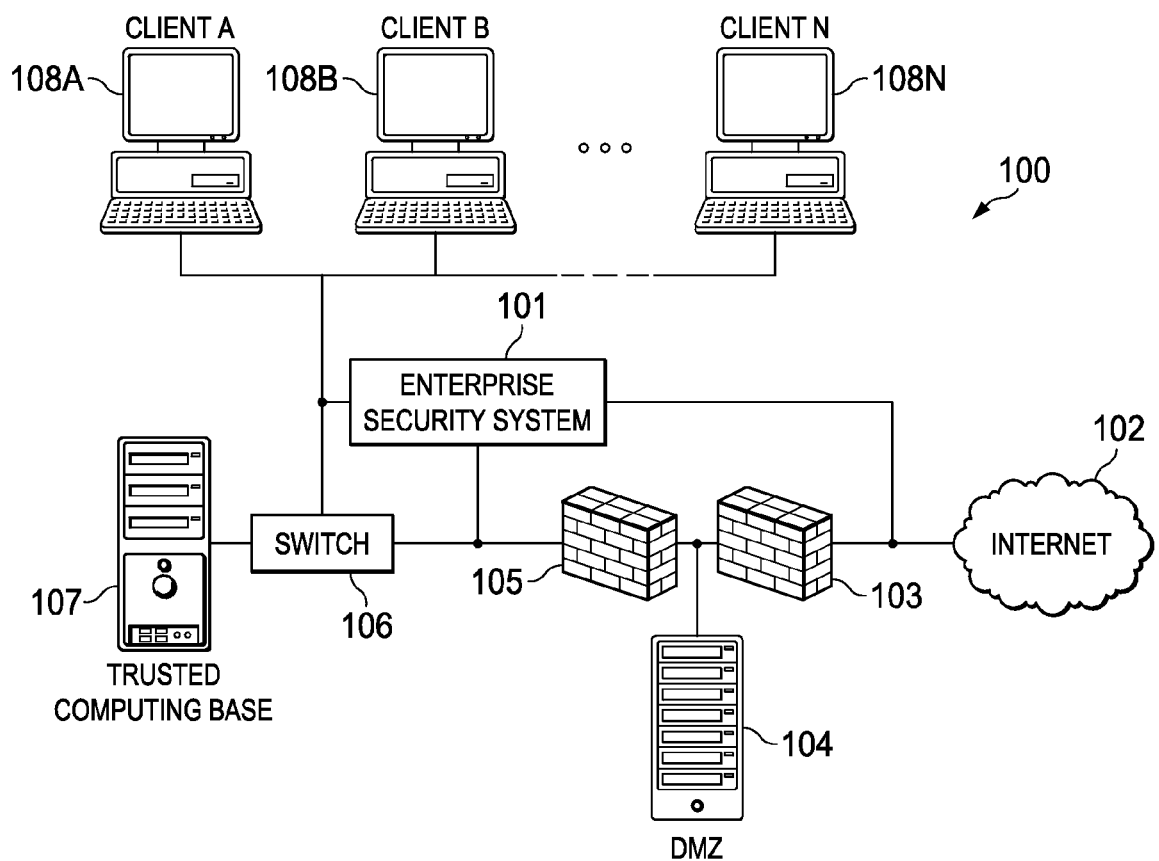
FIG. 1 is a block diagram of a communications network employing an enterprise security system, according to some embodiments.

Turning to FIG. 1, a block diagram of an example of communications network 100 employing enterprise security system 101 is depicted according to some embodiments. As illustrated, a demilitarized zone (DMZ) computer or sub-network 104 is coupled between a dual firewall system including front-end firewall 103 and back-end firewall 105. In operation, front-end firewall 103 may be configured to allow network traffic from Internet 102 that is destined to DMZ 104 only, whereas back-end firewall 105 may only allow only traffic from DMZ 104 to the internal, enterprise network. In this example, the enterprise network includes one or more switches or routers 106, trusted computing base (TCB) or sub-network 107, and a plurality of client computers 108A-N. Accordingly, enterprise security system 101 may be coupled to network 100 at various locations, such as, for example, between switches or routers 106 and client computers 108A-N and/or back-end firewall 105, as well as between front-end firewall 103 and Internet 102.

In various embodiments, enterprise security system 101 may be configured to detect emergent behaviors in networks 100. For example, enterprise security system 101 may include one or more computer systems (e.g., as shown in FIG. 3) executing an enterprise security software application (e.g., as shown in FIG. 2) and configured to perform one or more of the various techniques described in connection with FIGS. 4-8.

It should be noted, however, that network 100 is presented for sake of illustration only. Different enterprise network implementations may include numerous variations from what is illustrated in FIG. 1. For example, in some cases, TCB 107 may be absent, DMZ 104 may be absent, fewer or more firewalls 103 and 105 may be employed, and/or Internet 102 may be replaced with another enterprise's computer network or the like. Additionally or alternatively, in some implementations, one or more of the elements shown in FIG. 1, including enterprise security system 101, may be remotely located with respect to network 100 (i.e., "on the cloud").

Figure 2:
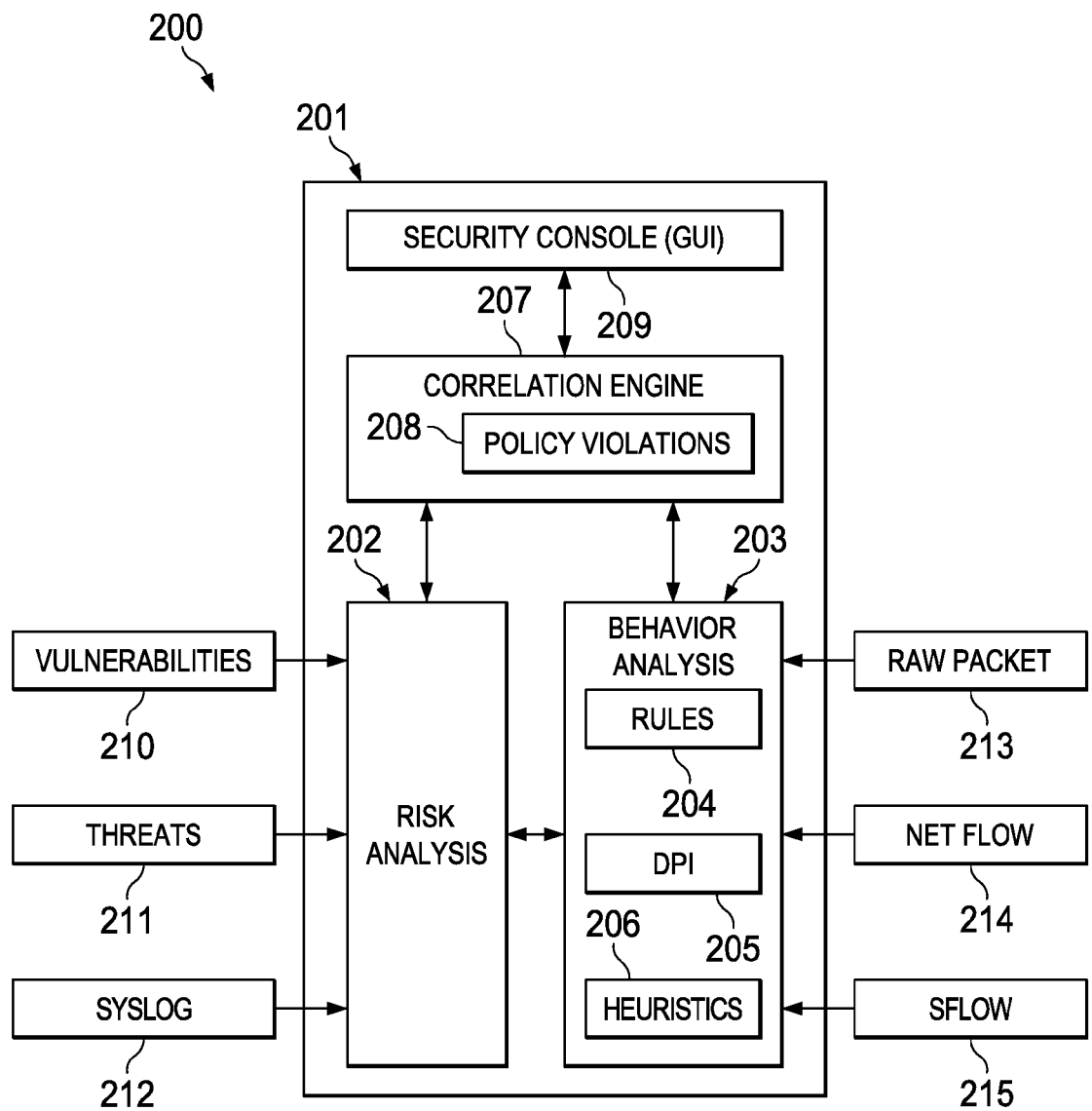
FIG. 2 is a block diagram of an enterprise security software application, according to some embodiments.
Figure 3:
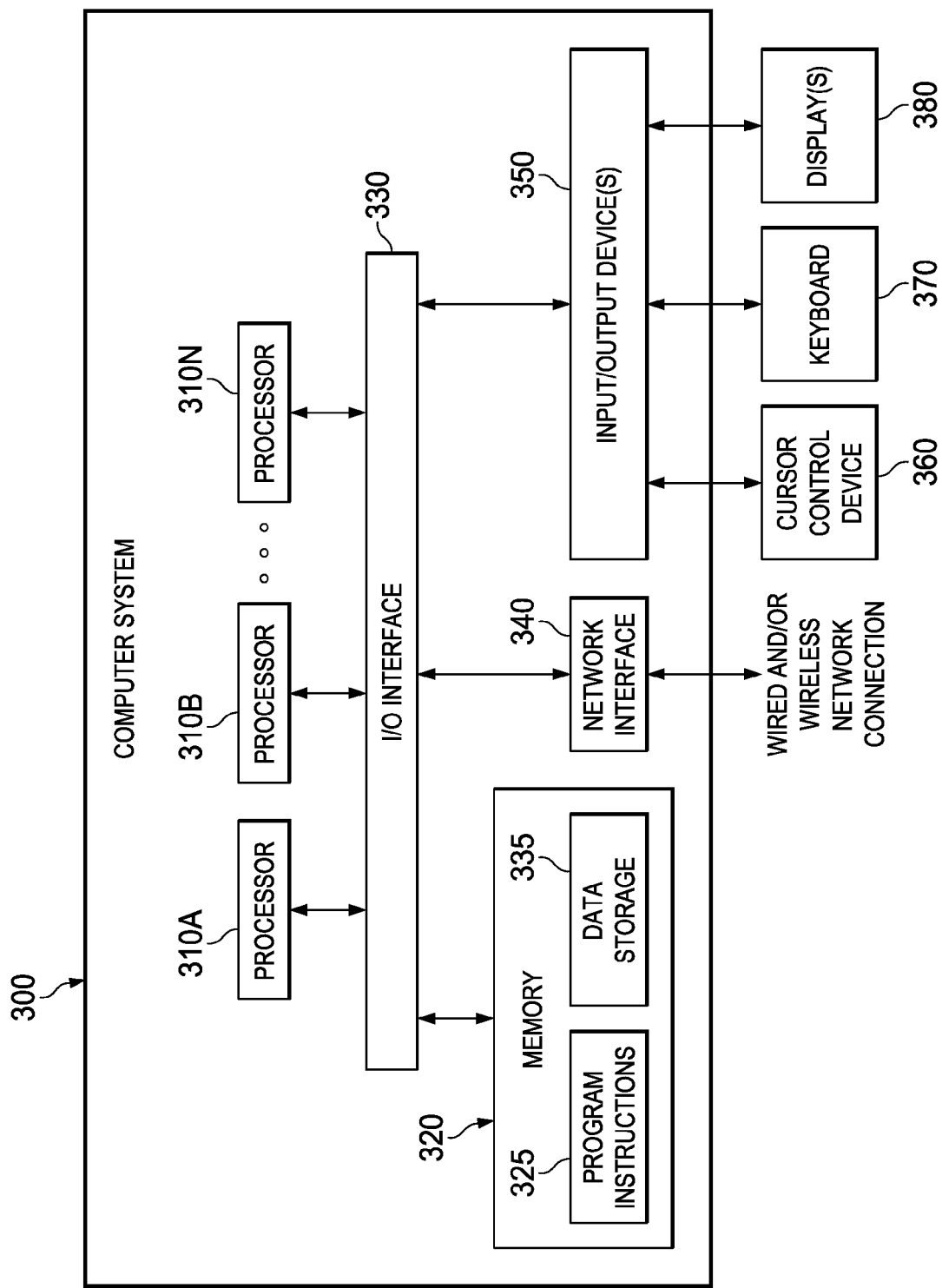
FIG. 3 is a block diagram of a computer system configured to implement various systems and methods described herein, according to some embodiments.

FIG. 2 is a block diagram of an example of an enterprise security software application 201 configured to execute in network environment 200. In some embodiments, application 201 may be executed, at least in part, by enterprise security system 101 of FIG. 1. As illustrated, risk analysis module 202 may receive one or more of vulnerability data 210, threat data 211, and/or data log (e.g., Syslog or other format) 212. Meanwhile, behavior analysis module 203, including rules sub-module 204, Deep Packet Inspection (DPI) sub-module 205, and heuristics sub-module 206, may receive raw packets 213, and/or traffic flow information, for example, in the form of NetFlow® data 214, sFlow® data 215, or the like. Risk analysis module 202 and behavior analysis module 203 are coupled to correlation engine 207, which includes policy violation sub-module 208. Correlation engine 207 is in turn coupled to security console 209 (e.g., a Graphical User Interface (GUI) or the like).

Generally speaking, security console 209 may provide a user with access to security threat data, including a view of prioritized security threats and the underlying data that created them. Correlation engine 207 may receive data from risk analysis module 202 and behavior analysis module 203, perform one or more correlation operations and provide alert data to security console 209 based, at least in part, upon policy violations determined in sub-module 208. Risk analysis 202 may receive threat data and provide it to correlation engine 207 and/or behavior analysis module 203. In turn, behavior analysis module may be configured to identify certain behaviors based upon traffic data, and provide an indication of those behaviors to correlation engine 207 and/or risk analysis module 202.

As such, enterprise security software application 201 may enable true integration and intelligent, adaptive information sharing/correlation of detected threats and alerts with detected vulnerabilities in a network, thus providing long-term context to threats and early warnings of threats and attack reconnaissance. In some cases, enterprise security software application 201 may leverage the rich data derived from the correlation of weeks of raw packet data, detected vulnerabilities, signature detection applications, posted vendor alerts, globally detected threats, logs from 3rd party security and other devices, as well as network access policy violations. For example, enterprise security software application 201 may analyze and continuously correlate packet data, Intrusion Detection System (IDS) alerts, scans, vendor threats, and tracked resources over long periods of time (e.g., spanning days, weeks, and/or months). Moreover, enterprise security software application 201 may be configured to detect emergent behaviors in communications networks, for example, when implementing one or more of the techniques shown in FIGS. 4-8.

In some embodiments, during the course of its operations, enterprise security software application 201 may include or otherwise have access to one or more databases (not shown). Generally speaking, such a database may include any suitable type of application and/or data structure that may be configured as a persistent data repository. For example, a database may be configured as a relational database that includes one or more tables of columns and rows and that may be searched or queried according to a query language, such as a version of Structured Query Language (SQL). Alternatively, a database may be configured as a structured data store that includes data records formatted according to a markup language, such as a version of XML. In other embodiments, a database may be implemented using one or more arbitrarily or minimally structured data files managed and accessible through any suitable type of application. Further, a database may include a database management system (DBMS) configured to manage the creation, maintenance, and use of the database.

It should be recognized, however, enterprise security software application 201 is presented for sake of illustration only. In certain embodiments, each of the different components of application 201 may be implemented in software, hardware or a suitable combination thereof, wherein in an integrated (e.g., on a single server or computer system) or in a distributed fashion (e.g., via a number of discrete systems configured to communicate with one another via a network). Additionally or alternatively, the operation of enterprise security software application 201 may be partitioned into components in a different fashion than illustrated in FIG. 2.

As noted above, embodiments of systems and methods of detecting emergent behaviors in communications networks may be implemented or executed, at least in part, by one or more computer systems (e.g., as enterprise security system 101 of FIG. 1). An example of such a system is illustrated in FIG. 3. In various embodiments, system 300 may be implemented as a server, a mainframe computer system, a workstation, a network computer, a desktop computer, a laptop, mobile device, or the like. In different embodiments, these various systems may be configured to communicate with each other in any suitable way, such as, for example, via a bus or network.

As illustrated, system 300 includes one or more processor(s) 310A-N coupled to a system memory 320 via an input/output (I/O) interface 330. Computer system 300 further includes a network interface 340 coupled to I/O interface 330, and one or more input/output devices 325, such as cursor control device 360, keyboard 370, display(s) 380, and/or mobile device 390. In various embodiments, computer system 300 may be a single-processor system including one processor 310, or a multi-processor system including two or more processors 310A-N (e.g., two, four, eight, or another suitable number). Processor(s) 310A-N may be any processor capable of executing program instructions. For example, in various embodiments, processor(s) 310A-N may be general-purpose or embedded processors implementing any of a variety of instruction set architectures (ISAs), such as the x86, POWERPC®, ARM®, or any other suitable ISA. In multi-processor systems, each of processors 310A-N may commonly, but not necessarily, implement the same ISA. Also, in some embodiments, at least one processor 310A-N may be a graphics-processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the other figures, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-accessible medium may include any tangible storage media or memory media such as magnetic or optical media—e.g., disk or CD/DVD-ROM coupled to computer system 300 via I/O interface 330.

In an embodiment, I/O interface 330 may be configured to coordinate I/O traffic between processor(s) 310A-N, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor(s) 310A-N). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, mobile devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325 configured to implement certain embodiments described herein (e.g., software 201, etc.), and data storage 335 comprising various data accessible by program instructions 325 (e.g., one or more database(s), etc.). In an embodiment, program instructions 325 may include software elements of embodiments illustrated in FIG. 2. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that may perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Referring now collectively to FIGS. 1-3, the inventor hereof has recognized that cyber attacks will continue to evolve and successfully evade otherwise traditional detection methods deployed in network 100. In fact, the notion of developing defenses derived from the study of successful network security breaches and malware to identify specific behaviors and attributes (aka "digital signatures") to interrogate real-time network traffic is hopelessly flawed. Not only is it unrealistic to compare traffic against all known signatures (60,000+), the ability of attackers to simply modify their behavior to alter the signatures is virtually infinite. Even the application of anomaly detection techniques is narrowly applied to identify anomalies corresponding to rigidly defined behaviors, such as communications protocols, while failing to take into account the infinite complexities of human behavior.

Understanding these facts, cyber attackers intentionally space out related reconnaissance activities, modify their techniques, and utilize multiple attack platforms to routinely evade detection. Further, both signature and anomaly detection methods have been unable to deal with complex behaviors unwittingly introduced via social engineering techniques, mobile computing, and an ever-increasing array of portable communication devices. Although advanced persistent threat (APT) attacks are difficult to identify, the theft of data is not completely invisible. Therefore, some might draw the conclusion that anomaly detection is sufficient to detect APT attacks, but the post mortem forensic analysis of APT attacks clearly indicates a working knowledge of traditional anomaly detection methods and techniques, and the ability to evade detection.

Traditional anomaly detection is based upon linear systems theory, such as superposition theory. However, APT attacks are not linear systems. Instead, APT attacks are complex systems that mix specialized utilities and human behavior. Since systems engineers have conventionally divided and conquered in order to work on complexity at a more manageable level through decomposition, APT attack evasion has been possible by avoiding common behaviors. Additionally, systems engineers have conventionally studied the behavior of the system elements in order to understand the behavior of the overall system through reconstruction. However, this approach is invalid as applied to non-linear (or complex) systems, and the cyber attackers that develop APT attacks know this.

By definition, APT attacks are best characterized as emergent behavior. By the philosophy as well as the science of systems theory, emergence is the way complex systems and patterns arise out of a multiplicity of relatively simple interactions. Therefore, emergent behavior is that which cannot be predicted through analysis at any level simpler than that of the system as a whole, rendering traditional anomaly detection methods impotent. In other words, emergent behavior is what remains after everything else in a complex system has been explained.

Figure 4:
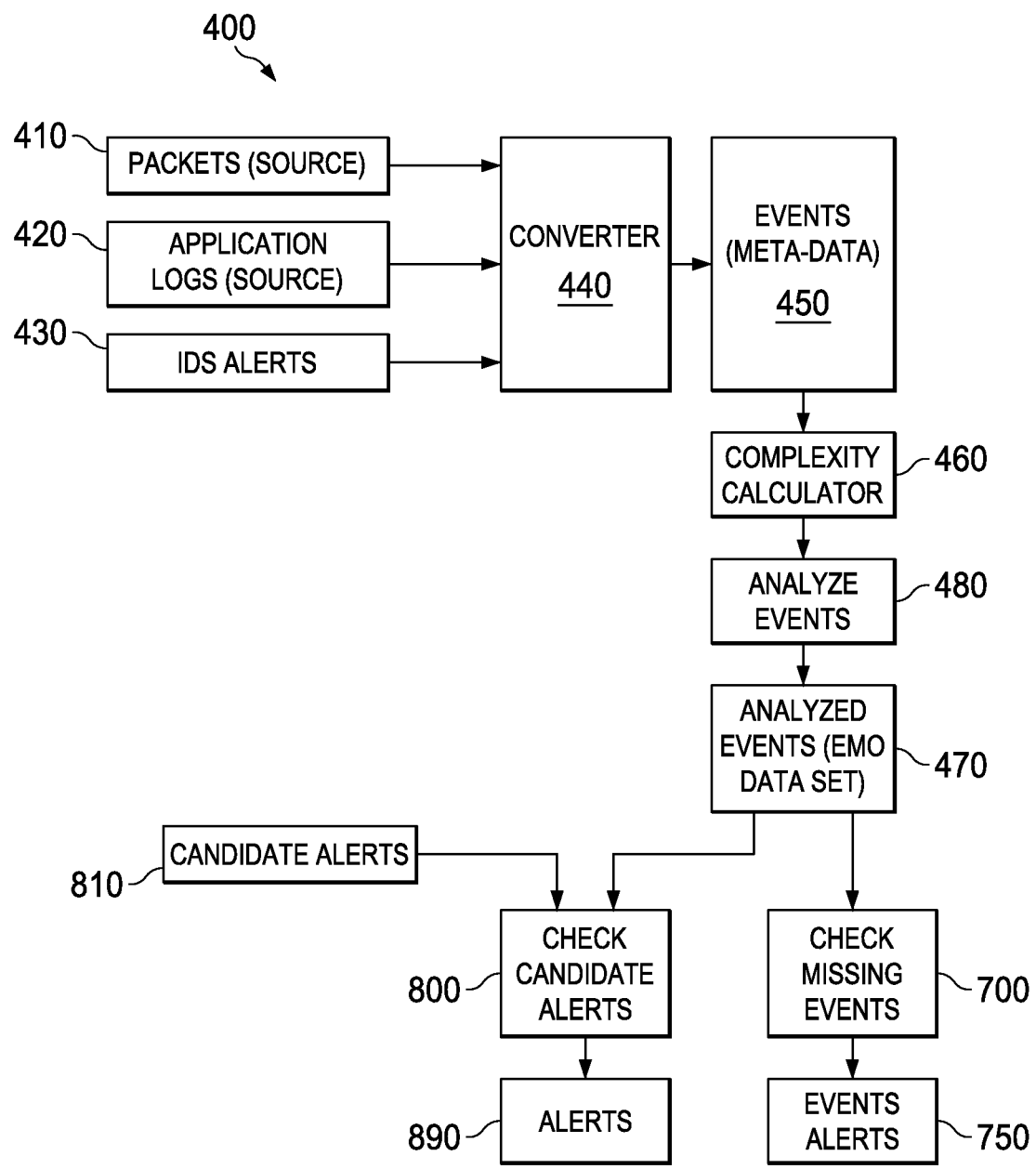
FIG. 4 is a flowchart of a method for analyzing meta-data to detect emergent behaviors associated with a cyber security attack on a communications network and generating appropriate alerts, according to some embodiments.
Figure 5:
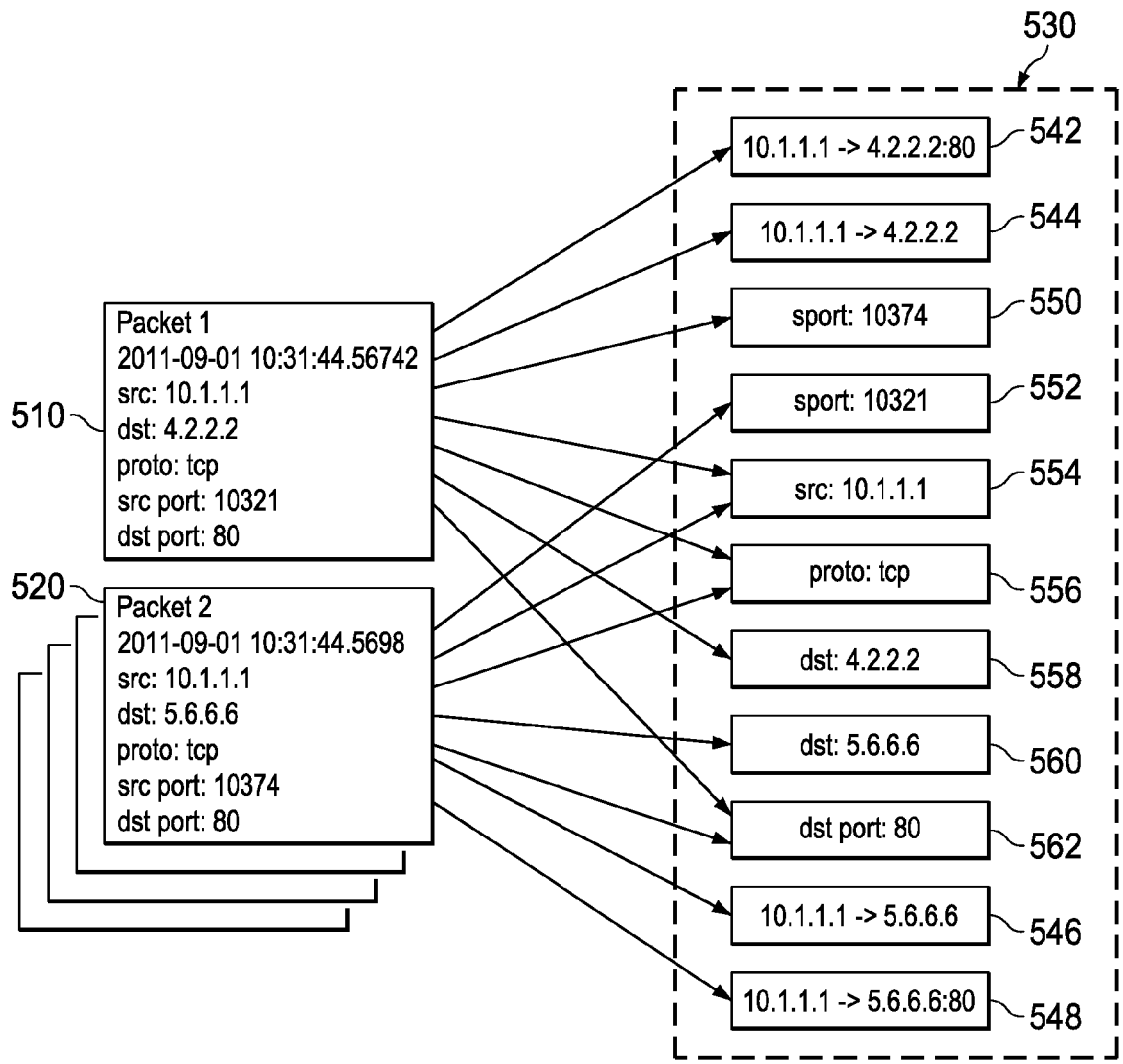
FIG. 5 is a diagram of data fields in network packets being decomposed into base components from statistic storage, according to some embodiments.

The various techniques discussed below in connection with FIGS. 4 and 5 are directed to detection methods capable of analyzing complex systems and thereby overcoming the limitations of signature and anomaly detection methods. In an embodiment, these detections methods may be operable to detect emergent behavior(s) within an unknown population sample where normal and abnormal behaviors are undefined and unknown, yet discernable.

Recognizing that a complex network is a form of self-organizing system, the present emergent behavior detection methodology uses advanced analysis techniques, including isomorphic connectivity patterns in state spaces, evolutionary combinatorial optimization theory and particle swarm optimization theory, to find the high-level network activities that emerge from complex systems operating within defined rule sets. This approach provides a higher level set of meta-data that can be used to find unusual or altered operation of lower-level systems that make up the whole, allowing detection of very low level activities that are the indicators of an APT attack.

In an embodiment, event objects may include four (4) layers of data, three (3) real and one (1) implied, as shown in Table 1 below:

TABLE 1

| | |
|---|---|
| PSO Score Value:<br>(0 = Abnormal, 1 = Normal) | Particle swarm optimization (PSO) score value. |
| Biasing Adjustment | Math layer, algorithms, calculations. Simple calculations are performed in this layer that use the "memory" of the event table. |
| Event(s) | Links to all related events. All known relations are gathered using isomorphic mathematical rings to gather all "related" types in this layer. |
| Base Data (Frequency, Alerts, etc.) | Encoded, but not directly included. The relationships of connections of this layer are not understood. |

One or more of the following assumptions may be applied to the data analysis that follows:

(1) There are isomorphic connections in the base data.

(2) An understanding of the isomorphic connections themselves is not required. Instead, the isomorphic connections are used to leverage the calculations.

(3) A network is a state space both mathematically and temporally. There is a finite set of states the network (every system and segment of wire) can be in, and any given state is defined by a set (hidden or not) of rules. This is referred to as a state space and allows for appropriate mathematical analysis given a stringent and clearly defined set of network protocols that control the state, thereby making the set of possible states finite.

(4) Isomorphism is found by setting the following goals: (a) determine how often this occurs normally, and (b) bias events as string outliers. Based on these two goals, the present method relies on particle swarm optimization analysis and evolutionary computational optimization to analyze and predict data.

Evolutionary Computational Optimization (ECO):

For nonlinear problems, like complex systems, the computational complexity of evaluating gradients and Hessians can be excessive. For some problems of nonlinear programming, the iterative methods differ according to whether they evaluate Hessians, gradients, or only function values. While evaluating Hessians and gradients improves the rate of convergence of methods, such evaluations increase the computational costs associated with each iteration.

Since there are two goals, evolutionary multiple objective (EMO) algorithms may be used. With a large number of individual points of data, a large/slow EMO like NSGA-II may be prohibitive. However, a network data set is temporal, with a clearly researchable sequence (time-stamped packets and alerts, even though 60% of the data is not time-stamped, 100% of the base data is). Therefore, since the time can be looked up, knowledge of the sequence is available that many EMOs cannot leverage.

An iterative approach may be used with initial predictions put into production even when the confidence is unknown, so long as the iterations continually improve through the EMO. Simply stated, while most EMOs run through iterations until convergence reaches a desired level of confidence, it is unclear whether any given set of data will converge, or even the level at which it might converge. This approach does not allow for decisions to be made fast enough to respond to threats on modern fast networks. Nevertheless, so long as the same level of convergence is measured, a predictable view of "normal" is provided. Conversely, something that typically converges within 100 iterations, for example, is "abnormal" when it suddenly requires 1000 iterations to achieve the same level of convergence or it no longer converges at all.

To handle a data set, a single iteration is run through the data each period (capture interval, day, day of week, day of month, etc.), and the data is allowed time to converge. The ability to converge is then recorded, but not the final solution (which is unknown).

Flow of Data for APT Detection:

FIG. 4 depicts an overall flow chart outlining one embodiment of a method 400 for analyzing meta-data to detect emergent behaviors associated with a cyber security attack on a communications network and then generate appropriate alerts.

According to the method 400 of FIG. 4, raw packets 410, applications log files 420, and IDS alerts 430 are some possible suitable candidates for inclusion as sources of raw data. These sources of raw data have related linked data types such that isomorphisms will work. Common choices of linked data types are source address (src), destination address (dst), protocol (proto), source port (src port or sport), and destination port (dst port). These raw data sources 410, 420, and/or 430 are converted to a set of data types by a converter 440.

FIG. 5 schematically depicts one embodiment of a method 500 for converting raw data sources to a set of data types by decomposing the data fields into all base components from statistic storage. In the method 500 of FIG. 5, two packets 510 and 520 comprising raw data sources are converted to a set 530 of component data types by the converter 440 of FIG. 4. FIG. 5 provides a representative example of the different isomorphic data types that may come from each single packet 510 and 520, and demonstrates how like data is accumulated.

The converter 440 creates a large data set 530 containing the individual elements in various combinations that capture a gradient of meta-information. High-level data types are not very detailed, such as source address 542, 544, 546, 548, which may be only one field, whereas low-level data types are more detailed and may combine multiple fields, such as a service request (source address 554, destination address 558, 560, and destination port 562).

Referring back to FIG. 4, all the levels that make sense (source port 550, 552 is ephemeral for service requests and has lower value than destination port 562, for instance) may be captured and tracked in an "events" database 450 comprising the metadata used to find emergent behaviors.

Events are combined when retrieved from the events database 450 into event objects, which contain all the data types from the lowest level requested to the highest level requested. For example, if TCP src:sport→dst:dport is requested, the event object would contain (from highest level data type to lowest): ip:src, ip:dst, tcp:src, tcp:dst, tcp:sport, tcp:dport, ip:src→dst, tcp:src→dst, tcp:src→dst:dport, tcp:src:sport→dst:dport. The source data (packets 410, logs 420, IDS alerts 440) are first deconstructed by the converter 440 and stored in the "events" database 450 along with appropriate data values or "counts" (packets in, packets out, data in, data out, for example) to be retrieved at any data level later.

Event Object Creation:

An event object is created from a given set of data points that can include source address (src), destination address (dst), source port (src port or sport), destination port (dst port), date, time, or protocol (proto) such as tcp, udp, etc., in any combination. The stored event information is gathered for each data point.

Following are several representative examples of event object creation:

Example 1

Lowest level request, a complete pairing given proto tcp, src, sport, dst, and dst port:

---
Get all data for src
Gel all data for dst
Get all data for tcp, src
Gel all data for tcp, dst
Get all data for tcp, sport
Get all data for tcp, dst port
Get all data for tcp, src and dst
Get all data for src and dst
Get all data for tcp, src and sport
Get all data for tcp, src and dst port
Get all data for tcp, dst and sport
Get all data for tcp, dst and dst port
Get all data for tpc, src, sport, dst, and dst port
---

Example 2

Medium Level Request, a Service

Given: src→dst:dst port

Since this request contains a src to a dst and dst port, the method would determine information regarding the particular src to the dst port regardless of protocol:

---
Get all data for src
Gel all data for dst
Get all data for tcp, src
Gel all data for tcp, dst
Get all data for tcp, dst port
Get all data for tcp, src and dst
Get all data for src and dst
Get all data for tcp, src and dst port
Get all data for tcp, dst and dst port
Get all data for tcp, src, dst and dst port
---

Example 3

High Level Request

Given: proto tcp,dst:dport

Since this request contains only a dst and dst port, the method would determine information about a host and that particular service for tcp protocol requests from other devices.

---
Gel all data for dst
Gel all data for tcp, dst
Get all data for tcp, dst port
Get all data for tcp, dst and dst port
---

Example 4

Highest Level Request

Given: src

Since this request contains only a source address, the method would get all data for src regardless of the prototype.

Identifying the EMO Data Set of Events for Analysis by the EMO Algorithm:

Referring again to FIG. 4, certain events from the events database 450 are identified for inclusion in the Analyzed Events EMO Data Set 470 by running the events through a complexity calculator 460 and then analyzing the events at block 480.

In more detail, at block 480, each subset of information includes two data points: counts and time periods. Counts may include data in, data out, packets in, packets out, along with date and time. Time periods may be established to conduct EMO analysis one hour per day, every 30 minutes, or every 15 minutes, for example. For each given time period, the predicted data points (data in, data out, etc.) are calculated using all possible combinations of time frames as possible values for the EMO, including each time period of day, each day of the week (Monday through Sunday), each day of the month (1-31), each week of the month (1-4, with the first week containing the first Thursday, for example), and each day of the year (1-365). This produces for each event a record for each data point in all components of the event.

As a representative example, if the counts are data in, data out, packets in, packets out, then for Example 1 presented above, the following would be recorded:

---
Data in, data out, packets in, packets out for src
Data in, data out, packets in, packets out for dst
Data in, data out, packets in, packets out tcp, src
Data in, data out, packets in, packets out tcp, dst
Data in, data out, packets in, packets out tcp, sport
Data in, data out, packets in, packets out tcp, dst port
Data in, data out, packets in, packets out tcp, src and dst
Data in, data out, packets in, packets out src and dst
Data in, data out, packets in, packets out tcp, src and sport
Data in, data out, packets in, packets out tcp, src and dst port
Data in, data out, packets in, packets out tcp, dst and sport
Data in, data out, packets in, packets out tcp, dst and dst port
Data in, data out, packets in, packets out tpc, src, sport, dst, and dst port
---

This data is recorded for the current time period (based on the time interval), for each day of the week (Monday through Sunday), each day of the month (1-31), each week of the month (1-4 with the first week being the first that contains a Thursday), and each day of the year (1-365). This would result in: 13 (values)*4(data points)*5(date time possibilities)=260 records per time interval.

The results may be stored in the following record format:

---
date
time interval—the interval such as 00:00-00:15
data type—code for the period, such as interval, day of week (dow), day of month (dom), day of year (doy), time interval (ti)
packets in—the count of packets in
packets out—the count of packets out
data in—the total data transferred inwards (to internal address)
data out—the total data transferred out (from internal address).
---

The values would be different if different data is collected. If the record does not already exist, then the record is created. Otherwise, the record is added to the value. To demonstrate in more detail, consider the following example (assuming 10.1.1.1 is the internal host):

---
Packet 1:

TCP: 10.1.1.1:10234 -> 192.168.1.1:80 data in = 100
Add 1 packet out for 10.1.1.1, port 10234, and 10.1.1.1:10234 (address with port)
---

-continued

Packet 1:

Add 1 packet in for 192.168.1.1, port 80 and 192.168.1.1:80 (address with port)
Add 100 (data out) for 10.1.1.1, port 10234, and 10.1.1.1:10234 (address with port)
Add 100 (data in) for 192.168.1.1, port 80 and 192.168.1.1:80 (address with port)

Packet 2:

TCP:10.1.1.1:10234 -> 192.168.100.100:23 data in = 64
Add 1 packet out for 10.1.1.1, port 10234, and 10.1.1.1:10234 (address with port)
Add 1 packet in for 192.168.100.100, port 23 and 192.168.100.100:23 (address with port)
Add 64 (data out) for 10.1.1.1, port 10234, and 10.1.1.1:10234 (address with port)
Add 64 (data in) for 192.168.100.100, port 23 and 192.168.100.100:23 (address with port)

At the beginning of the run, the records for Packet 1 would not exist and would be created. The values for Packet 2 would then be added to the 10.1.1.1.port 10234, and 10.1.1.1:10234 records since they already exist. Because high level values (less granular) are updated more often, all data is collected in the Analyzed Events EMO Data Set database 470 before an analysis is run to determine whether an alert should be issued.

Since many raw data sources, such as packets 110, logs 120, and ID alerts 130, are accumulated high level data types, like src, they will have large accumulated totals since many different raw sources will contain them, while low level types like pairings, will have smaller accumulated totals because, since they are more specific, they will accumulate less raw sources.

Referring again to FIG. 4, once the Analyzed Events EMO Data Set 170 is established, an EMO analysis may be performed, as described in more detail herein with respect to FIG. 6. Then a Check Missing Events analysis 700 may be performed to check for missing events, as described in more detail herein with respect to FIG. 7. In general, if an event would normally be expected to occur at a particular time, and the event is not identified during the Check Missing Events analysis at 700, then a missing event alert 750 may be issued to the console.

Figure 8:
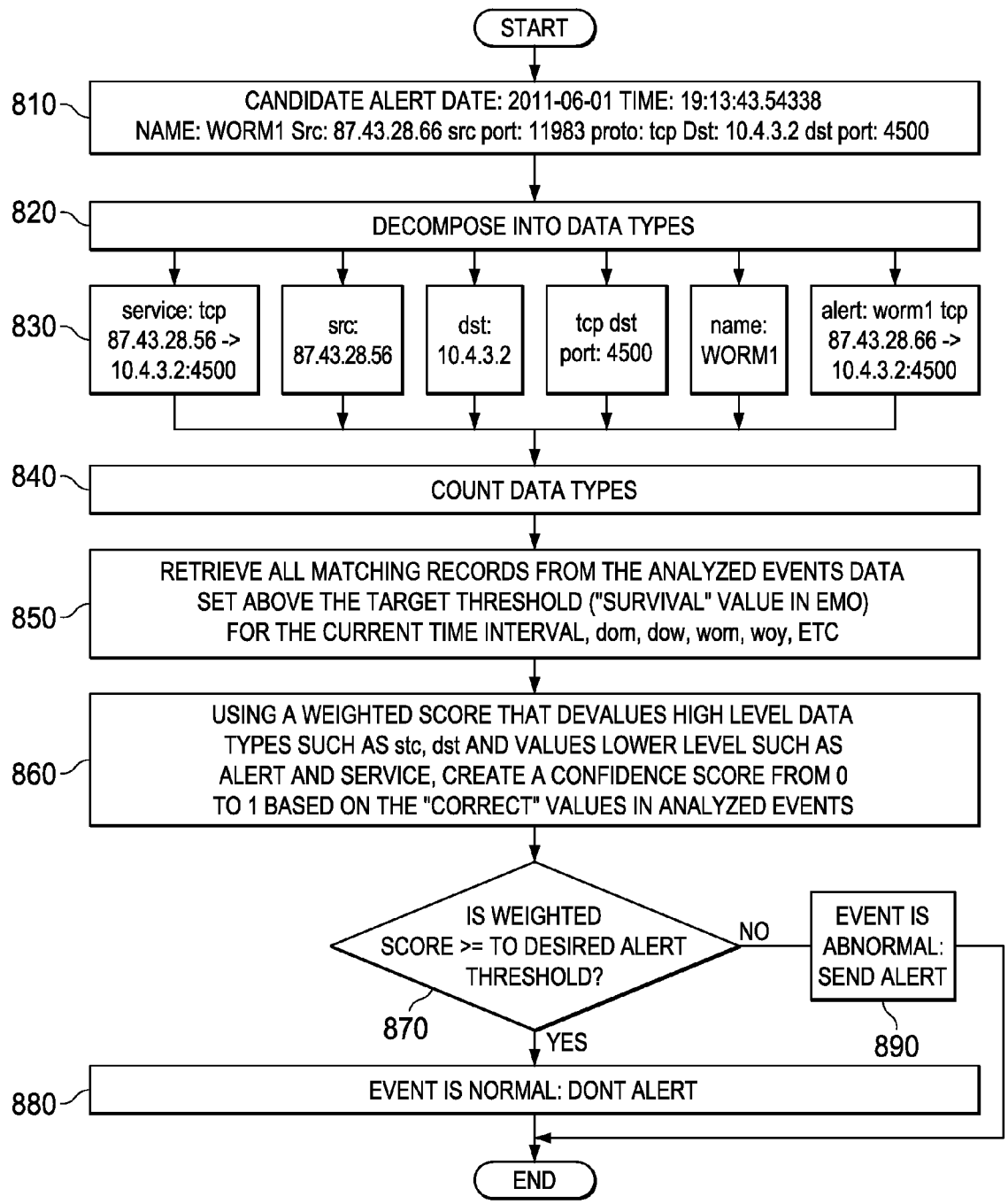
FIG. 8 is a flowchart of a method for executing a Checking Candidate Alerts (CCA) technique and reporting an alert when an anomaly is detected, according to some embodiments.

In addition, once the EMO Data Set 470 is established and the EMO analysis is performed, a Check Candidate Alerts analysis 800 may be performed to identify anomalous data, as described in more detail herein with respect to FIG. 8. In general, a new generation of raw data alerts 410, 420, 430 from the system make up the candidate alerts 810 that are analyzed by the Check Candidate Alerts algorithm 800 to identify emergent behaviors. The candidate alerts 810 are compared to the Analyzed Events EMO Data Set 470. If the candidate alert 810 is considered abnormal based on its complexity, its values or the time at which it is detected, then an alert 890 is sent to the console; otherwise is may be suppressed or other action may be taken.

Figure 6A:
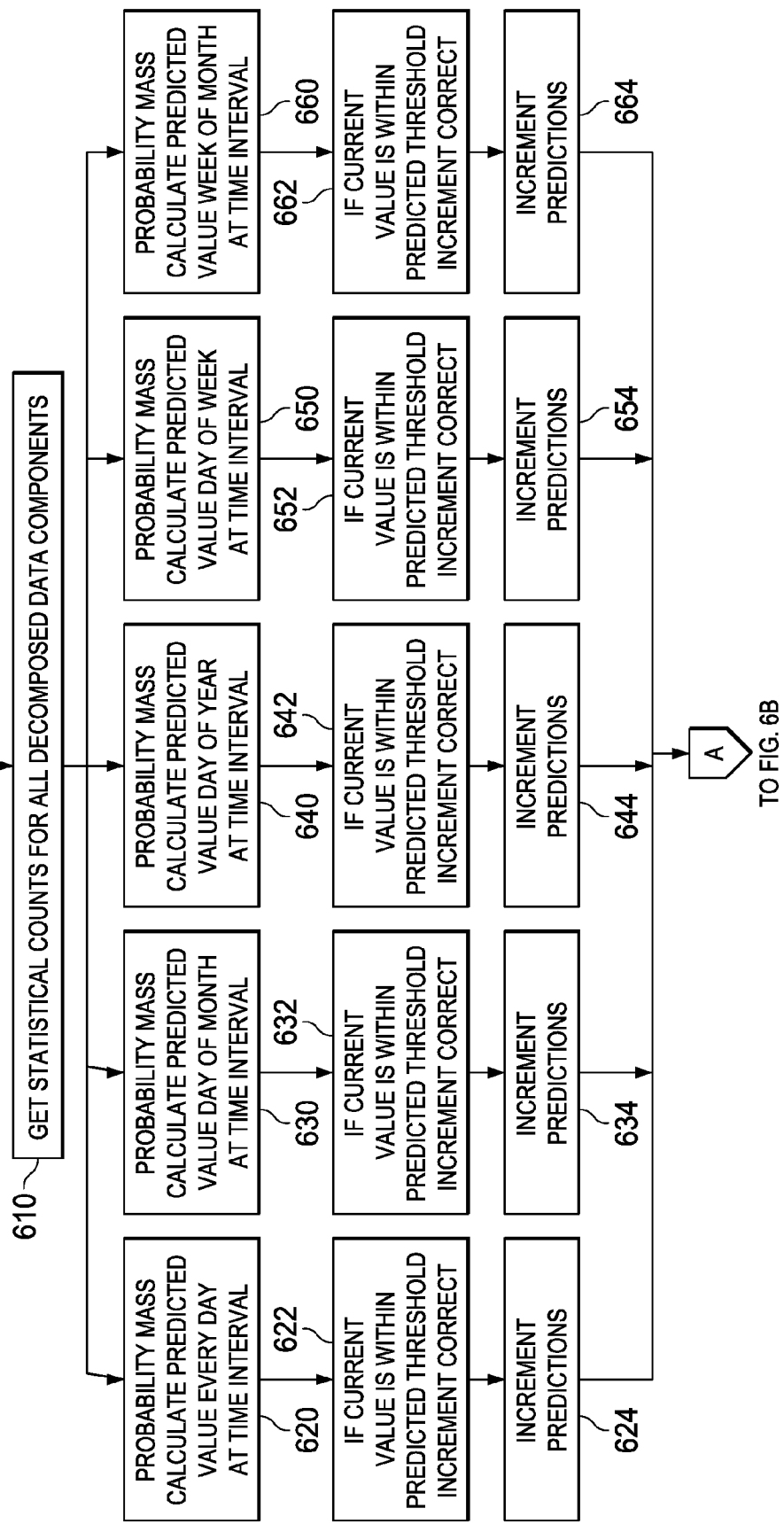
FIG. 6A and FIG. 6B together form a flowchart of a method for executing an Evolutionary Multiple Objective (EMO) technique, according to some embodiments.
Figure 6B:
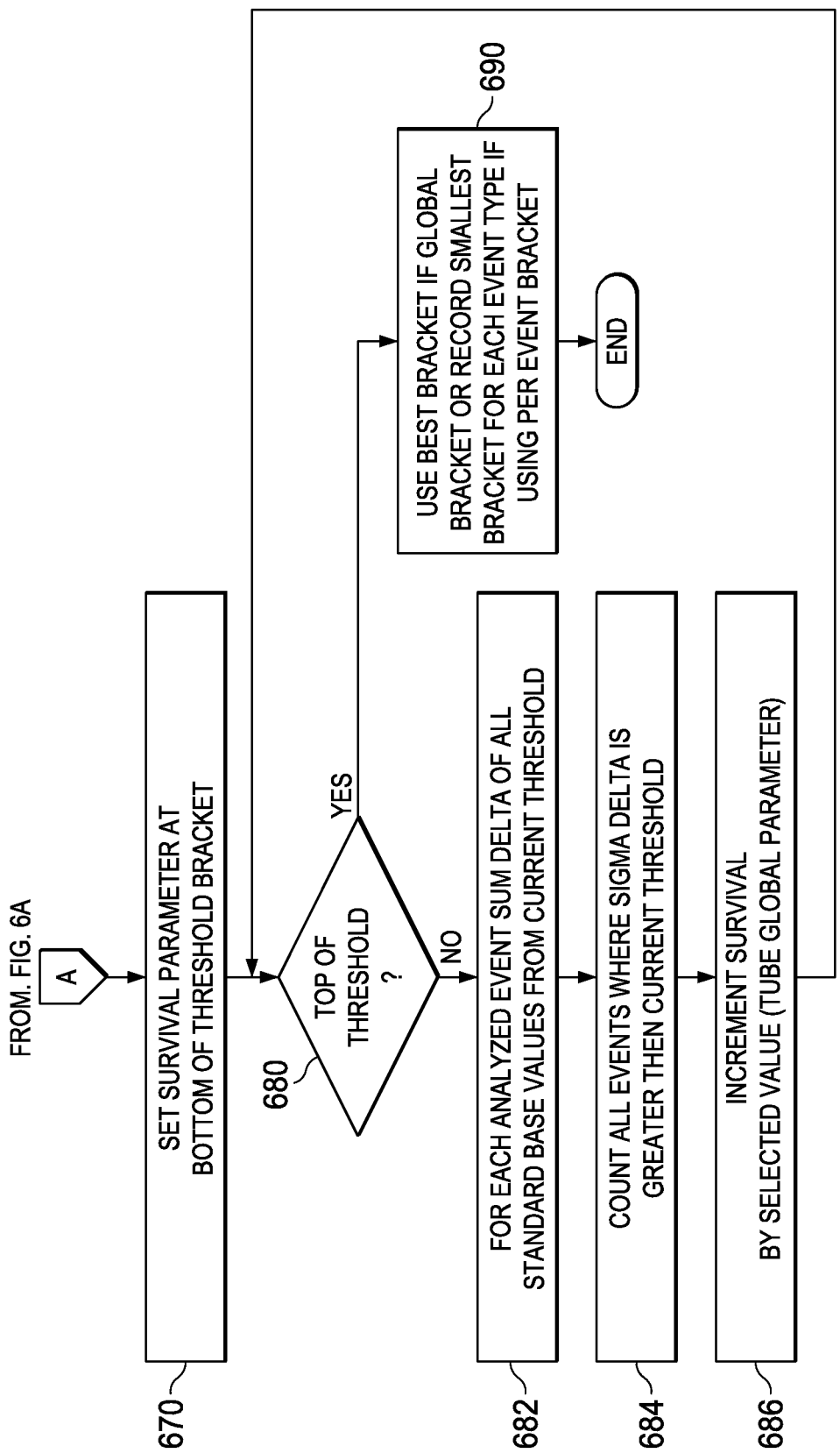

EMO Analysis Run:

FIG. 6A and FIG. 6B together depict a flow chart outlining one embodiment of a method 600 for running an Evolutionary Multiple Objective (EMO) analysis algorithm. Once the data is calculated for the current time period and collected in the EMO Data Set 470, an EMO analysis run can occur. Referring first to FIG. 6A, at block 610, the statistical counts (data in, data out, packets in, packets out, etc.) for the multiple sets of new data just calculated and collected in the EMO Data Set 470 are retrieved and then compared at blocks 620, 630, 640, 650, and 660 for all possible time periods that are deemed suitable (high strength), as discussed in more detail below. A representative EMO Data Set record may comprise the following parameters:

time interval—the interval such as 00:00-00:15
    type—code for period such as interval, day of week (dow), day of month
    (dom), day of year (doy), time interval
    key—the time value for the data type such as day of year, day of week, etc
    Data—the type of data packets, packets out, data in, data out, or other tracked data types
    value—the value for the given data type as calculated by the probability mass
    correct—the number of times a prediction was correct
    predicts—the number of times a prediction has been made
    runcount—the number of times in a row the prediction is correct
    threshold—see below An overall "threshold" may be established for the EMO. This threshold is the desired percentage of correct guesses for any given data type and may be changeable for the EMO. Alternatively, the threshold may optionally be stored per each record, as indicated above in the representative record.

In an embodiment, at blocks 620, 630, 640, 650, and 660, a discrete probability distribution (Poisson process or Bayesian events, for example) may be used to calculate the most likely value of any prediction for each time frame, such as the time interval at block 620, the day of the month at the time interval at block 630, the day of the year at the time interval at block 640, the day of the week at the time interval at block 650, and/or the week of the month at the time interval at block 660. Generally speaking, the more time frame analyses performed, the better the predictions. A simple average, such as mode, may be used. Alternatively, mean may be used to provide simpler and faster calculations.

To perform the EMO analysis, for each value in the EMO Data Set 470 that is suitable (equal or greater than the given threshold), the current value as just calculated is evaluated to determine whether the data is normal or an anomaly. At blocks 622, 632, 642, 652, and 662, if the data is within the predicted value +/−the threshold then it is considered normal and the algorithm increments "correct." At blocks 624, 634, 644, 654, 664, for all the data that is considered normal, the algorithm increments that a prediction has been made.

If the data is not within the predicted value +/−the threshold then it is considered an anomaly. This evaluation will produce a list of predicted values that have fallen out of range and are considered anomalous. Such data should be published to the monitoring console as an alert.

Recalculating the EMO Data Set:

Once the newly calculated data has been analyzed by the EMO, then the EMO adjusts its calculations appropriately. First, the EMO Data Set 470 is updated by running the discrete probability distribution or average function for all values regardless of their suitability. This is stored as a new record set ("predicted"). New data may produce a new value, which will be compared to the value in the current data set for a given data point and time period. The stored data is the "calculated standard" based on events as recorded in the past.

Referring now to FIG. 6B, at block 670, the EMO considers all possibilities in the time based data set and calculates "survival" of all predicted values using the smallest delta from the calculated standard as the "evolutionary selection."

The "survival" may comprise a threshold and a standard deviation that takes into account the accuracy for a particular data type (the percent accurately predicted for a particular data type) and the accuracy of the current count. For example, if a particular data type is not predicted correctly very often (such as only 10% of the time), that data may be excluded by setting a threshold above 10%. For this particular set of data, survival may mean that the predictions need to be at least 20% accurate and within a certain standard deviation of the normal value.

In the process loop comprising blocks 680, 682, 684, and 686, using a percentage bracket, such as 5% for example, the EMO algorithm 600 makes iterative runs over the data at a given interval such as +/−5%, +/−4%, +/−3%, +/−2.0%, +/−1%. For each bracket percentage, at each time interval (sum of collected data points from packets) and each time period (day of the year (doy), day of the month (dom), time interval (ti), day of the week (dow), week of the year (woy)) the EMO counts the best survivors, which creates clusters of good predictions around predictable time periods for given data points at suitable time intervals.

The EMO increments a value to indicate when a survivor is within a small threshold of the correct answer (such as +/−5%) and decrements it when it is incorrect. This is the record of suitability.

In more detail, at block 682, starting at the bottom of the bracket, the EMO considers all events in the database and identifies how many fall within that percentage of the predicted value (median or probability mass, for example) for each time period, at the current interval. At block 684, if the total number of values is within the current bracket, then at block 686, it increments strength. If not, it decrements strength. The algorithm 600 returns to block 680 to determine if the top of the threshold has been reached, and if not, the algorithm 600 repeats blocks 682, 684 and 686 until the top of threshold is reached. At block 690, if thresholds are assigned to each data point, it calculates the smallest percentage possible with an acceptable (global parameter) number of survivors and sets that as the data point threshold for future use.

One representative example follows:
In EMO data set:
1→2.3.3.3:80 at 9:00-10:00

The source address 10.1.1.1 communicates to 2.3.3.3 on port 80 from 9:00 to 10:00 with a 98% accuracy to the previous data. Within this record are the values "data in," "data out," "packets in," "packets out." For this example, assume the record reflected in Table 2:

TABLE 2

| Type | Key | Time Interval | Day of Week | Day of Year | Day of Month | Data | Value | Predicts | Correct |
|---|---|---|---|---|---|---|---|---|---|
| service | 10.1.1.1->2.3.3.3:80 | 10 | 1 | 201 | 12 | Data in | 518,442 | 100 | 98 |
| service | 10.1.1.1->2.3.3.3:80 | 10 | 1 | 201 | 12 | Data out | 78,956 | 100 | 99 |
| service | 10.1.1.1->2.3.3.3:80 | 10 | 1 | 201 | 12 | Packets in | 42 | 100 | 97 |
| service | 10.1.1.1->2.3.3.3:80 | 10 | 1 | 201 | 12 | Packets out | 13 | 100 | 54 |

Table 2 data indicates that the EMO has previously been correct at least 97% of the time for "data in", "data out", and "packets in", but only 54% of the time for "packets out". However, because the data is fully decomposed, additional entries exist as reflected in Table 3:

TABLE 3

| Type | Key | Hour of Day | Day of Week | Day of Year | Day of Month | Data | Value | Predicts | Correct |
|---|---|---|---|---|---|---|---|---|---|
| src | 10.1.1.1 | 10 | 1 | 201 | 12 | Data in | 978,743 | 100 | 96 |
| src | 10.1.1.1 | 10 | 1 | 201 | 12 | Data out | 482,511 | 100 | 95 |
| src | 10.1.1.1 | 10 | 1 | 201 | 12 | Packets in | 587 | 100 | 97 |
| src | 10.1.1.1 | 10 | 1 | 201 | 12 | Packets out | 312 | 100 | 80 |
| dst | 2.3.3.3 | 10 | 1 | 201 | 12 | Data in | 40,133 | 67 | 46 |
| dst | 2.3.3.3 | 10 | 1 | 201 | 12 | Data out | 15,321 | 67 | 47 |
| dst | 2.3.3.3 | 10 | 1 | 201 | 12 | Packets in | 58 | 67 | 32 |
| dst | 2.3.3.3 | 10 | 1 | 201 | 12 | Packets out | 121 | 67 | 14 |
| dst port | 80 | 10 | 1 | 201 | 12 | Data in | 19876432 | 1200 | 648 |
| dst port | 80 | 10 | 1 | 201 | 12 | Data out | 11977321 | 1200 | 454 |
| dst port | 80 | 10 | 1 | 201 | 12 | Packets in | 14399 | 1200 | 621 |

TABLE 3-continued

| Type | Key | Hour of Day | Day of Week | Day of Year | Day of Month | Data | Value | Predicts | Correct |
|---|---|---|---|---|---|---|---|---|---|
| dst port | 80 | 10 | 1 | 201 | 12 | Packets out | 8032 | 1200 | 388 |

Thus, the end result of the EMO is a grid of data that is predictable for a given time period, which may be the exact interval (meaning each day at a given time), for a given day of the month at that time, a given day of the year at that time, or a given day of the week at that time. Because the raw source data is deconstructed to its constituent components and recorded separately, the exact nature of the underlying data may be unknown even though a trend is found, leading to behaviors that emerge for operation of the complex system (the network). Checking current values for all deconstructed components at suitable time periods yields a measurement of current behavior versus previously seen behavior, making this method operable for intrusion detection.

The EMO data is recalculated each time a new package of data, representing the packets 410, logs 420, or alerts 430, from a given time frame, is received.

Complexity Calculator:

Because data may change in structure or organization, but not in predictable counts (data in, data out, etc.) the EMO is unable to detect differences in organization changes at higher levels of data. In other words, if an APT attacker is aware of the methodology used by the EMO to calculate data, then the APT attacker may be able to add enough decoy packets to bring the counts to the proper values, or optimize intrusive communications to keep packet counts down in order to match the previously seen values.

Example

A given source generally produces 500 packets in with 100K of data inbound and 250 packets out with 100K data outbound. If the host is interrupted, enough packets of the required sizes may be spoofed from the host to fool the EMO analysis run.

For this reason, it may be beneficial to employ another method to determine organizational changes within the base data (as opposed to the metadata). Finding relationships of higher-level data points and checking those relationships at each run may accomplish this. Particle swarm optimization, approximate entropy computation, and forced vector surface optimization method are all methods that may be used to check for changes in complex relationships.

Particle Swarm Optimization and Force Vector Surface Optimization—

Conventional particle swarm optimization (PSO) is a computational method that optimizes a problem by iteratively trying to improve a candidate solution with regard to a given measure of quality. Collectively, the possible set of solutions is called the swarm. PSO optimizes a problem by having a population of candidate solutions, referred to as particles, and moving these particles around in the search-space according to simple mathematical formulae relating the suitability of the solution to the particle's position and velocity. The movement of each particle is influenced by its local best-known position, and it is also guided toward the best-known positions in the search-space, which are updated as better positions are found by other particles. This is expected to move the swarm toward the best solutions.

PSO is meta-heuristic as it makes few or no assumptions about the problem being optimized and can search very large spaces of candidate solutions. However, meta-heuristics such as PSO do not guarantee an optimal solution is ever found. More specifically, PSO does not use the gradient of the problem being optimized, which means PSO does not require that the optimization problem be differentiable as is required by classic optimization methods such as gradient descent and quasi-Newton methods. PSO can therefore also be used on optimization problems that are partially irregular, noisy, and/or change over time.

With respect to network behavioral analysis, captured suspicious packet data is not a swarm, although events within the data occur like one. For example, a single packet state may be represented as a series of events directed at various network resources that travel through changing routes. Each event (derived points of event data in base data from the events table) may be designated as one of the candidate solutions, also known as a particle, and multiple instances of data may be allowed and designated as separate particles. The goal may be set to use as little space as possible (compress data set).

A PSO algorithm may be used to assign a PSO score value to an event object. First, the Cartesian coordinates (X, Y) in space may be set to random. The PSO algorithm is used to maintain all interconnections (data in alerts, data in pairs, etc.) to a state where particles have the least amount of variation (statistical dispersion) in the state of the packets. The level of variation (statistical dispersion) is referred to as "jitter." The jitter may be measured. A little jitter as compared to a stable state is considered normal, and a lot of jitter as compared to a stable state is considered abnormal. A PSO score value of zero (0) may be assigned to abnormal event objects and a PSO score value of one (1) may be assigned to normal event objects based on the jitter measurement.

Additionally or alternatively, a variation of the PSO methodology, referred to as Force Vector Surface Swarm Optimization (FVSSO) may be used. FVSSO is a method of determining the complexity and/or differential complexity of a set of related data. It uses the concept of force vectors to optimize a set of data in such a way that a stable form can be found by convergence within a given tolerance of iterations. In the case where convergence does not occur in a minimum set of iterations, the cumulative movement of the vectors at the last iteration is a measure of complexity. Once a given set of data is sampled and recorded, the amount of iterations until convergence or jitter if there is no convergence will show the differential of complexity if the data set is modified.

The FVSSO process involves creating an ephemeral surface that will serve the purposes of optimization classification. The surface includes a set of points that vector end points can exist, which can be thought of as an X-Y grid like the Cartesian coordinate system. Each point on the surface can hold only one vector end point (data point), which is considered a particle. The size of the surface will determine how quickly a data set will convergence. If the surface is too small, the data set may not have enough space to converge, and if it is too big, convergence is unpredictable. The surface area is generally determined by the amount of data, but the swarm space will optimize the space required, allowing generally larger surfaces to be used.

Each particle (data point) becomes a vector on the surface with lines being drawn from it to all related particles on the surface. Initially the particles are placed randomly on the surface. Iterations begin, with each particle seeking to find its best local position to find a location where none of its vectors intersect vectors of other particles. This is the desired stable position. Each particle also has a calculated best swarm position and the final position is local position+swarm position.

A particle or data point has the following attributes:

> timer—a count down timer that decrements once per iteration until zero is reached, at which time an alarm signal is indicated;
> local x,y—the best local position on the surface to achieve swarm goals (particle is clean);
> swarm x,y—the amount in surface units to add to move towards the best swarm position to achieve swarm goals;
> state—a given state of the particle (see below);
> move vector—a vector that is used by various states;
> speed—the maximum units a particle will move;
> jitter—the distance the particle moved since last iteration; and
> clean/dirty indicator—whether the particle is clean (none of its vectors intersect others) or dirty (it has at least one vector that intersects others).

Particles will have one of the following given states:

New—

The particle is new and is not yet initialized. It has only its location on the surface, but does not know how many vectors it has that intersect (dirty) or that do not intersect (clean). In this state, the particle is initialized (as required by the calculation engine such as initial values, calculations, and allocations). The state is then changed to "Examine."

Random—

The particle will move along a vector that is randomly picked, and 10% of the time pick a new random vector. On alarm, the speed is set to 4 points, the timer is set Pivot—

The particle will seek the center of the surface and become static. Once a particle is in the pivot state it will not change states. One pivot is required and should be the point with the most shared vectors (maximum or equal to). Multiple pivots can be picked, in which case the best local position puts them equidistant from the center but on a circle equidistant from each other in an order that makes them clean (if one can not be found then multiple pivots are not used).

Examine—

The particle will examine all its vectors and set its move vector to move it directly to the point furthest away that it shares a vector with unless it is already within 4 units of all points it shares vectors with. Local position is the position along this vector at current speed. On alarm, it changes or when it is within 4 points of all particles it shares vectors with, the timer is set to a random number between 10 and 72 iterations, the speed is set to 2 points, and the state is changed to "Rotate."

Rotate—

The particle will rotate an amount that is inverse to its distance (further away indicates slower rotation) to the particle that it shares a vector with that is furthest away. On alarm, the timer is set to 5 iterations and the state is changed to "Random."

Pause—

The particle does not change position. On alarm, the timer is set to a random number between 5 and 10 iterations, and the state is changed to "Examine."

Follow—

The particle will perform the same movements as the particle that has a vector to it that is one step closer to the pivot. The particle will stay in the "follow" state as long as all of it's vectors are clean otherwise it will go to the random state.

The swarm position is very simple. The swarm moves each particle or point at its current speed to the center, but at least 5 space units from the pivot if there is one.

Initially all particles start in the "New" state and will move to the "Examine" state at the same time. As iterations progress, particles will diverge into different states in which each point trying to reach a clean position using its current state.

In an embodiment of iteration according to the FVSSO process, a determination is made regarding whether the particle is dirty or clean. If the particle is dirty, then the particle will find its best local position depending on its current state and will change states and values in accordance with the state rules described above. Then the particle will be adjusted for swarm best position. If the particle is clean, then the particle will not change its best local position unless it is in the "follow" state in which case its best local position is dependent on a particle connected to it that is closer to the pivot, so the particle will ignore the swarm. Then the particle speed and timer are updated. The particle clean/dirty indicator is set based on a check of all shared vectors. A calculation is performed to determine particle jitter. Then all particle jitters are summed to determine swarm jitter.

According to the FVSSO process, the calculation should have a maximum number of iterations depending on the average size of particles in the application. Iterations continue until the swarm converges (all clean) or the maximum number of iterations is reached. The number of iterations required for convergence is a measure of the data's complexity with smaller numbers being less complex. For swarms that do not converge, the swarm jitter is a measure of complexity since clean particles do not move, thereby reducing jitter. For large complex data sets, a maximum jitter can be set and the swarm can be allowed to iterate until the swarm jitter is less than or equal to this amount. The number of iterations will indicate complexity.

The above method describes an EMO that learns slowly using iterative calculations, one per data set at given intervals. As such, the EMO comprises a multi-objective evolutionary optimization because it employs two objectives: time and the evolutionary selection of smallest delta to predicted values. As more iterations are run, the EMO's ability to detect subtle changes improves. But it should be noted that other MO-EMOs may be used if the evolutionary selection can be set for the given model and predictions could improve much quicker if continuously calculated. The above described EMO balances computational complexity versus speed by opting to learn slowly by spreading the iterations out over the natural time of the data being analyzed.

In an embodiment, the EMO uses fully deconstructed data sets, maintaining EMO records for every element of a network packet including:

> time interval—an interval of traffic from 10 minutes to an hour per analysis run;
> source address—source address of protocol, including hardware source address for data link layer;
> destination address—destination address of protocol, including hardware destination address for data link layer;
> source port—source port for UDP and TCP protocols;
> destination port—destination port for UDP and TCP protocols;

-continued pairing (src:sport, dst:dport)—address and port for TCP and UDP protocols;
envelopes (src:sport->dst:dport)—complete communication pairings;
services (src->dst:dport)—services requested and servers that the services are requested from;
service usage (src->dport)—services requested;
protocol source address (tcp:src, udp:src, etc)—source address with next protocol;
protocol destination address (tcp:dst, udp:dst, etc.)—destination address with next protocol;
icmp type:code—ICMP message types;
icmp src:type:code—ICMP message types with origin;
icmp dst:type:code—ICMP message receivers with types; and
icmp src:dst:type:code—complete ICMP message pairings In an embodiment, time periods for recording are:

Day of week—0-6 or Sunday-Saturday
Day of month—1-31
Week of month—the first week with a Thursday is week 1 for monthly closings
Day of year—0-364
Week of year—0-51
time interval—the period of time between analysis runs corresponding to data collection intervals This generates a very large data set, but the EMO determines what part of the data set is good. If a given value is calculated and is suitable, the EMO will find the combinations and time period and deconstructed data points over which the calculated value is accurate. In an embodiment, thresholds are stored per record with a separate system that tries different thresholds (percentages of the average or standard deviation) for each record using iterative EMO analysis runs. In various embodiments, probability distributions, such as Bayesian logic systems, Poisson distribution, mean and mode, for example, may be employed individually or in combination and tried per iteration and over time to determine which function best serves a given time period for a given data point. Once this is learned, the function can be set for that calculation in the future and checked periodically to ensure that is still the best choice.

In an embodiment of architecture, packets are collected and used to create events. A high-speed packet database may be employed for packet retrieval, along with a standard relational database for EMO data sets and the event data. Because the processing is intense, the data set may be processed in parallel over multiple cores or a cluster of machines.

Figure 7:
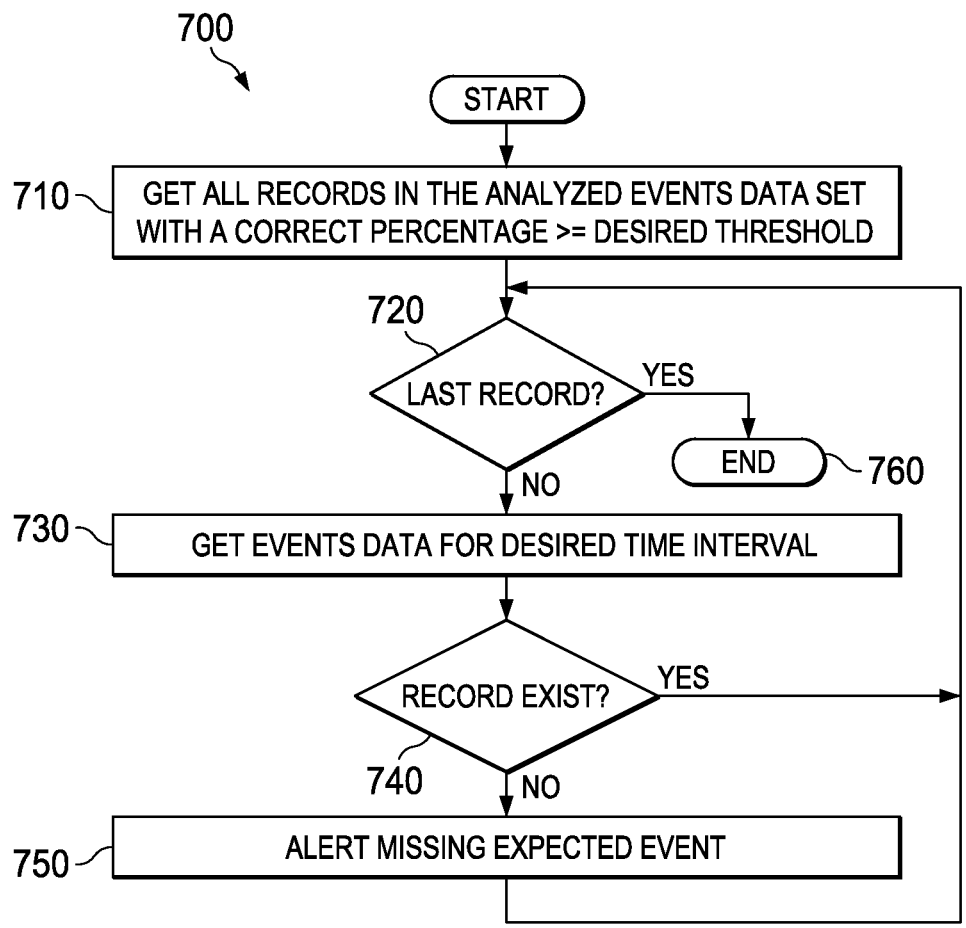
FIG. 7 is a flowchart a method for reporting an alert when an expected event is missing, according to some embodiments.

Checking Missing Events:

Referring now to FIG. 7, a flowchart is depicted of one embodiment of a method 700 for reporting an alert 750 when no event data is received for events that have been learned by the EMO and are therefore expected to occur, i.e. an expected event is missing. At block 710, all records in the analyzed events data set with a given correct percentage above a desired threshold are collected and analyzed individually. At block 720, the algorithm evaluates whether a particular record is the last record in the collected record set. If so, then the method 700 ends at 760. If not, then at block 730, the algorithm attempts to locate records that have the corresponding data type (src→dst:dst port, src→dst) and the corresponding time period (dom, dow, doy, etc.). At block 740, if such an event record is found, the method 700 returns to block 720 to evaluate whether the record is the last record in the collected data set. At block 740, if no such event record is found, the algorithm generates an alert at 750 indicating that an expected event is missing.

For time periods such as day of the week, the check should occur only once in that given period at the same time, such as checking for all days of the year at midnight on the following day after a full 24 hours of source data has been collected.

Checking Candidate Alerts (CCA):

The events system produces a number from zero (0) to one (1), where zero indicates unknown/abnormal, and one indicates known/normal.

Referring now to FIG. 8, a flow chart is depicted outlining one embodiment of a method 800 for running a Checking Candidate Alert (CCA) algorithm. At block 810, a candidate alert object is generated. At block 820, all related analyzed events are loaded into the EMO data set and then decomposed, such as via converter 440 in FIG. 14 into the component data types 830, which are also loaded into the EMO data set.

At block 840, the count data types are established. In particular, an algorithm counts the different data types (data in, data out, etc.) against what is predicted for that time frame, and to determine whether the values fall within the threshold. The example shown in FIG. 8 reflects six data types in the decomposed data at block 830, so with 100% accuracy, for example, the resulting number after the count data types block 840 would be six, and with 50% accuracy, for example, the resulting number after the count data types block 840 would be three.

At block 850, the analyzed events EMO data set at 470 of FIG. 4 are checked using all the current time periods (interval, day of month, day of week, week of month, week of year, etc.) to retrieve all matching records that the EMO has marked suitable on the basis that the record exceeds the target threshold.

At block 860, a weighted sum is used that devalues higher level data that match lots of source data and values low level sources, assigning each a number between 0 and 1 that combines amount off the probability mass calculated prediction and the weight, thus providing score that indicates an aggregate discrepancy between the data and the prediction, and which can be measured in standard deviations or other methods according to the selected mass probability function. Data points are a measure of how far off the alert data is from the standard value as calculated by the EMO for suitable data points. Also at block 860, using some changeable threshold, such as a weighted score that devalues or gives a lower weight to high level data types that are not very detailed, such as src and dst, and values or gives a higher weight to lower level data types such as alert and service, which are very detailed and specific, a confidence score is created between zero (0) and one (1) and a value between 0-1 is returned, which is the percentage that are correct.

At block 870, if the confidence score value is equal to or greater than the alert threshold, the method 800 moves to block 880 for a normal event and no alert is sent (i.e., the candidate alert is suppressed). Alternatively, at block 870, if the confidence score value is not equal to or greater than the alert threshold, the method 800 moves to block 890 for an abnormal event and an alert is sent or issued. Lower thresholds produce fewer alerts, but have a higher chance of producing false negatives.

The various systems and methods illustrated in the figures and described herein represent example embodiments of systems and methods of detecting emergent behaviors in communications networks. These methods may be implemented in software, hardware, or a combination thereof. The order in which each operation of a given method is performed may be changed, and various elements of the systems illustrated herein may be added, reordered, combined, omitted, modified, etc.

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
   performing, by a computer system:
   decomposing a plurality of data packets into a plurality of component data types, the plurality of data packets associated with a candidate alert representing a potential security threat in a communications network;
   retrieving, from a database, a count for each of a plurality of historical data types, the plurality of historical data types matching at least a subset of the component data types, each of the counts quantifying an amount of data of a corresponding historical data type previously detected in the communications network in a given time period;
   calculating a score that indicates an aggregate discrepancy between an amount of data in each of the subset of the component data types and the counts for each corresponding one of the historical data types for a particular hour of day, a particular day of the week, the particular day within the month, and the particular day within a year for the given time period; and
   handling the candidate alert based, at least in part, upon the score, wherein handling the candidate alert further comprises issuing the candidate alert in response to the score meeting a threshold value, and suppressing the candidate alert in response to the score not meeting the threshold value.

2. The method of claim 1, wherein at least one of the plurality of component data types includes a combination of at least two elements selected from the group consisting of: a protocol, a source address, a destination address, a source port, a destination port, an alert type, and a service type.

3. The method of claim 2, wherein calculating the score further comprises:
   performing, by the computer system:
   applying a weight to a discrepancy involving a data type having a combination of fewer of the elements that is less than another weight applied to another discrepancy involving another data type having another combination of more of the elements; and
   calculating a weighted average of each discrepancy and corresponding weight.

4. The method of claim 1, wherein calculating the score further comprises:
   performing, by the computer system:
   at least one of:
   applying a weight to a discrepancy involving a time period equal to a day of the week that is less than another weight applied to another discrepancy involving another time period equal to a time interval;
   applying a weight to a discrepancy involving a time period equal to a day of the month that is less than another weight applied to another discrepancy involving another time period equal to day of the week;
   or applying a weight to a discrepancy involving a time period equal to a day of the year that is less than another weight applied to another discrepancy involving another time period equal to a day of the month; and
   calculating a weighted average of each discrepancy and corresponding weight.

5. The method of claim 1, wherein the counts include at least one of:
   a number of packets entering the communications network, a number of packets leaving the communications network, an amount of data entering the communications network, or an amount of data leaving the communications network.

6. The method of claim 1, further comprising, prior to handling the candidate alert:
   performing, by the computer system:
   calculating a complexity of one or more of the plurality of data packets; and
   modifying the score based, at least in part, upon the complexity.

7. The method of claim 6, wherein calculating the complexity further comprises executing a Particle Swarm Optimization (PSO) technique.

8. The method of claim 6, wherein calculating the complexity further comprises executing a Force Vector Surface Optimization (FVSO) technique.

9. The method of claim 1, further comprising:
   performing, by the computer system:
   updating, in the database, one or more of the counts for each of a plurality of historical data types in the given time period based, at least in part, upon the amounts of data in each of the subset of the component data types.

10. The method of claim 9, further comprising:
    performing, by the computer system:
    updating, in the database, a prediction accuracy of one or more of the counts for one or more historical data types corresponding to the subset of the components data types in the given time period.

11. The method of claim 1, further comprising, prior to calculating the score:
    performing, by the computer system:
    selecting the subset of the component data types among the plurality of data types, at least in part, by determining which of the corresponding historical data types has a prediction accuracy above a threshold value.

12. A computer system, comprising:
    at least one processor; and
    a memory coupled to the at least one processor, the memory configured to store instructions executable by the at least one processor to cause the computer system to:
    decompose a plurality of data packets into a plurality of component data types, the plurality of data packets associated with a candidate alert representing a potential security threat in a network, at least one of the plurality of data types including a combination of two or more of: a protocol, a source address, a destination address, a source port, or a destination port;

for each of the plurality of data types, determining one or more counts selected from the group consisting of:

a number of packets entering the network, a number of packets leaving the network, an amount of data entering the network, or an amount of data leaving the network;

update, in a database, one or more historical counts for each of a plurality of historical data types corresponding to the plurality of data types for a particular hour of day, a particular day of the week, the particular day within the month, and the particular day within a year for a given time period based upon the one or more counts; and perform at least one of: (i) issue a candidate alert in response to a score meeting a threshold value, or (ii) suppress the candidate alert in response to the score not meeting the threshold value.

13. The computer system of claim 12, the instructions further executable by the at least one processor to cause the computer system to:

update, in the database, a prediction accuracy of the one or more historical count for each of the plurality of historical data types corresponding to the plurality of data types in the given time period.

14. The computer system of claim 12, wherein the instructions are further executable by the at least one processor to cause the computer system to:

determine that an expected event has not taken place in the network based, at least in part, upon an analysis of the one or more historical counts in the given time period; and issuing a missing event alert.

15. A non-transitory computer-readable storage medium having program instructions stored thereon that, upon execution by a computer system, cause the computer system to:

decompose a plurality of data packets into a plurality of component data types, the plurality of data packets associated with a candidate alert representing a potential security threat in a computer network, at least one of the plurality of data types including a combination of at least two elements selected from the group consisting of:

a protocol, a source address, a destination address, a source port, a destination port, an alert type, and a service type;

retrieve, from a database, a count for each of a plurality of historical data types, the plurality of historical data types matching at least a subset of the component data types, each of the counts quantifying an amount of data of a corresponding historical data type previously detected in the computer network in a given time period, the counts including at least one of:

a number of packets entering the computer network, a number of packets leaving the computer network, an amount of data entering the computer network, or an amount of data leaving the computer network;

calculate a score that indicates an aggregate discrepancy between an amount of data in each of the subset of the component data types and the counts for each corresponding one of the historical data types for a particular hour of day, a particular day of the week, the particular day within the month, and the particular day within a year for the given time period, at least in part, by applying a weight to a discrepancy involving a data type having a combination of fewer of the elements that is less than another weight applied to another discrepancy involving another data type having another combination of more of the elements, and calculating a weighted average of each discrepancy and corresponding weight, wherein the given time period includes a combination of two or more of: a time interval, a day of the week, a day of the month, a week of the month, a day of the year, or a month of the year; and perform at least one of: (i) issue the candidate alert in response to the score meeting a threshold value, or (ii) suppress the candidate alert in response to the score not meeting the threshold value.

16. The non-transitory computer-readable storage medium of claim 15, wherein the instructions are further executable by the computer system to cause the computer system to:

calculate a complexity of one or more of the plurality of data packets; and modify the score based, at least in part, upon the complexity.

17. The non-transitory computer-readable storage medium of claim 16, wherein to calculate the complexity, the instructions are further executable by the computer system to cause the computer system to perform a Particle Swarm Optimization (PSO) technique.

18. The non-transitory computer-readable storage medium of claim 16, wherein to calculate the complexity, the instructions are further executable by the computer system to cause the computer system to perform a Force Vector Surface Optimization (FVSO) technique.

* * * * *